(12) United States Patent
Chou

(10) Patent No.: US 9,900,038 B2
(45) Date of Patent: Feb. 20, 2018

(54) COMMUNICATION DEVICE

(71) Applicant: JIENG TAI INTERNATIONAL ELECTRONIC CORP., New Taipei (TW)

(72) Inventor: Yu-Pang Chou, New Taipei (TW)

(73) Assignee: JIENG TAI INTERNATIONAL ELECTRONIC CORP., New Taipei (TW)

( * ) Notice: Subject to any disclaimer, the term of this patent is extended or adjusted under 35 U.S.C. 154(b) by 0 days.

(21) Appl. No.: 15/245,158

(22) Filed: Aug. 23, 2016

(65) Prior Publication Data

US 2017/0294931 A1    Oct. 12, 2017

(30) Foreign Application Priority Data

Apr. 8, 2016  (TW) .............................. 105111107 A

(51) Int. Cl.
*H04B 1/40* (2015.01)
*H04B 1/3827* (2015.01)
*H01Q 1/52* (2006.01)

(52) U.S. Cl.
CPC ............. *H04B 1/3833* (2013.01); *H01Q 1/52* (2013.01)

(58) Field of Classification Search
CPC ........ H04B 1/40; H04B 1/3822; H04B 1/406; H04B 1/44; H04B 1/48; H04B 1/525; H04B 1/18
USPC ............................... 455/75, 76, 77, 78, 550.1
See application file for complete search history.

(56) References Cited

U.S. PATENT DOCUMENTS

| | | | |
|---|---|---|---|
| 8,903,322 B2 * | 12/2014 | Wang | H04W 88/02 455/63.1 |
| 9,203,463 B2 * | 12/2015 | Asrani | H04B 1/68 |
| 2014/0333496 A1 * | 11/2014 | Hu | H01Q 1/243 343/745 |
| 2015/0172426 A1 * | 6/2015 | Asrani | H04B 1/40 455/77 |

* cited by examiner

*Primary Examiner* — Nhan Le
(74) *Attorney, Agent, or Firm* — CKC & Partners Co., Ltd.

(57) ABSTRACT

A communication device includes an antenna unit, an adjustment unit and a sensing and processing unit. The sensing and processing unit is electrically coupled to the antenna unit and the adjustment unit. The antenna unit is configured to transmit a radio frequency (RF) signal. The adjustment unit is configured to adjust a frequency and a bandwidth of the RF signal. The sensing and processing unit is configured to sense a capacitance, so as to control the adjustment unit to adjust the frequency of the RF signal according to the capacitance, and to control the adjustment unit to adjust the bandwidth of the RF signal according to a system signal.

9 Claims, 5 Drawing Sheets

COMMUNICATION DEVICE

RELATED APPLICATIONS

This application claims priority to Taiwan Application Serial Number 105111107, filed Apr. 8, 2016, which is herein incorporated by reference.

BACKGROUND

Technical Field

The present invention relates to a communication device. More particularly, the present invention relates to a communication device for adjusting a frequency and a bandwidth of a radio frequency signal.

Description of Related Art

A communication device can transmit or receive radio waves through an antenna for delivering or exchanging radio signals. However, the efficacy of radio signals is easily affected by ambiance (such as a human body or another electronic device). Using a portable electronic device (such as a cell phone) as an example for explanation, when a user uses the portable electronic device, the efficacy of an antenna in the portable electronic device is decreased by a nearby human's body. Besides, insufficient antenna bandwidth is also a common problem in this field.

SUMMARY

In order to improve the signal frequency shift caused by a human body and the insufficient bandwidth, an aspect of the present disclosure is to provide a communication device. The communication device includes an antenna unit, an adjustment unit and a sensing and processing unit. The antenna unit is configured to transmit a radio frequency signal. The adjustment unit is configured to adjust a frequency and a bandwidth of the radio frequency signal. The sensing and processing unit is electrically coupled to the antenna unit and the adjustment unit. The sensing and processing unit is configured to sense a capacitance through the antenna unit, to control the adjustment unit to adjust the frequency of the radio frequency signal according to the capacitance, and to control the adjustment unit to adjust the and width of the radio frequency signal according to a system signal.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

In order to make the description of the disclosure more detailed and comprehensive, reference will now be made in detail to the accompanying drawings and the following embodiments. However, the provided embodiments are not used to limit the ranges covered by the present disclosure; orders of step description are not used to limit the execution sequence either. Any devices with equivalent effect through rearrangement are also covered by the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

In this document, the term "coupled" may also be termed as "electrically coupled" and the term "connected" may be termed as "electrically connected." "Coupled" and "connected" may also be used to indicate that two or more elements cooperate or interact with each other.

Figure 1:
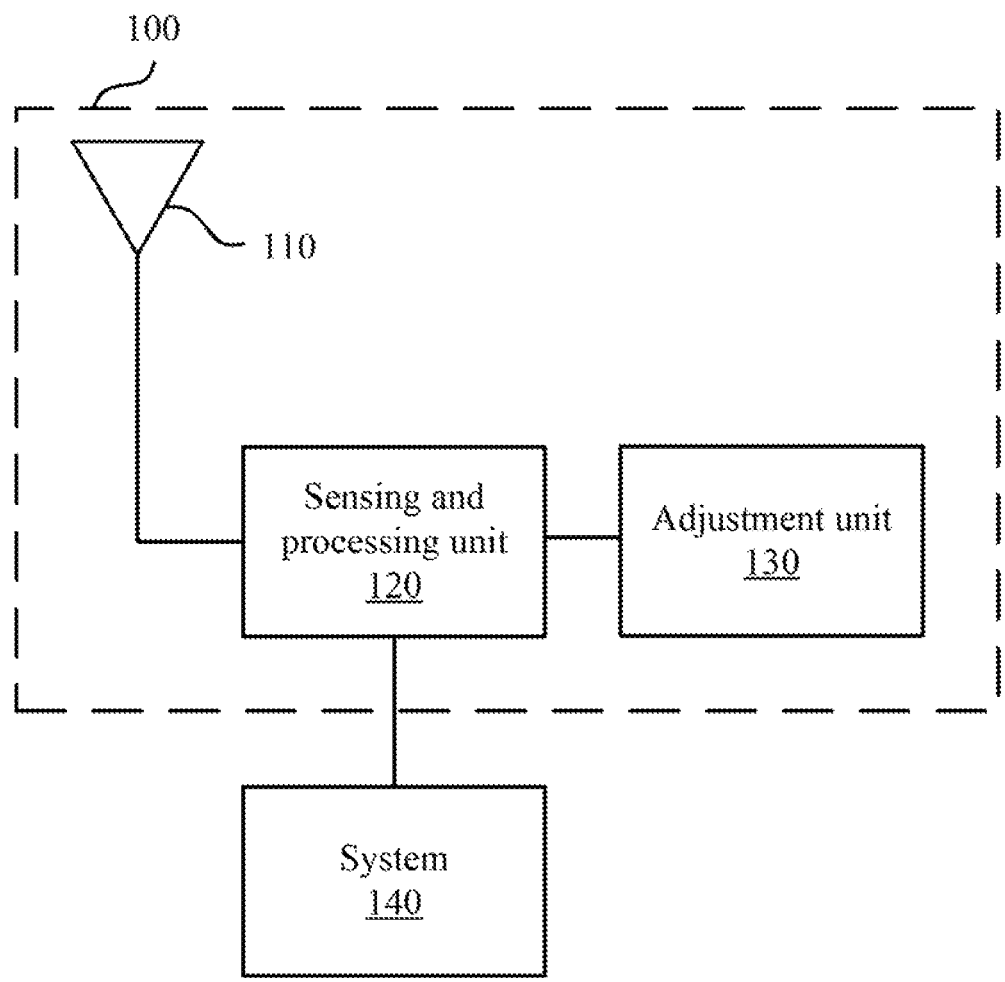
FIG. 1 is a schematic diagram of a communication device according to an embodiment of the present disclosure.

Reference is made to FIG. 1. FIG. 1 is a schematic diagram of a communication device 100 according to an embodiment of the present disclosure. The communication device 100 may be any electronic product with a communication function, such as a cell phone, a tablet PC a wireless access point device, etc. As shown in FIG. 1, in the present embodiment, the communication device 100 includes an antenna unit 110, a sensing and processing unit 120 and an adjustment unit 130.

In operation, the antenna unit 110 is configured to transmit a radio frequency (RF) signal. Specifically, the sensing and processing unit 120 is configured to detect whether a human body approaches the communication device 100, so as to determine a specific absorption rate (SAR) for the communication device 100. When the human body approaches the communication device 100, a capacitance of a coupling capacitor sensed by the antenna unit 110 is changed, such that the sensing and processing unit 120 can sense the capacitance of the coupling capacitor through the antenna unit 110. Then, the sensing and processing unit 120 controls the adjustment unit 130 to adjust a frequency of the radio frequency signal according to the capacitance, and controls the adjustment unit 130 to adjust a bandwidth of the radio frequency signal according to a system signal. In an embodiment, the system signal transmitted from a system 140 to the sensing and processing unit 120 indicates that the system 140 operates in a high frequency band, a low frequency band or a particular frequency band (such as long term evolution (LTE) frequency bands B7, B17). However, the present disclosure is not limited thereto.

As a result, the communication device 100 of the present disclosure can effectively adjust a frequency shift of the radio frequency signal caused by the human body, and improve a problem of insufficient bandwidth.

In an embodiment, the sensing and processing unit 120 controls, the adjustment unit 130 by using an open loop method. The adjustment unit 130 then adjusts the frequency and the bandwidth of the radio frequency signal.

Figure 2:
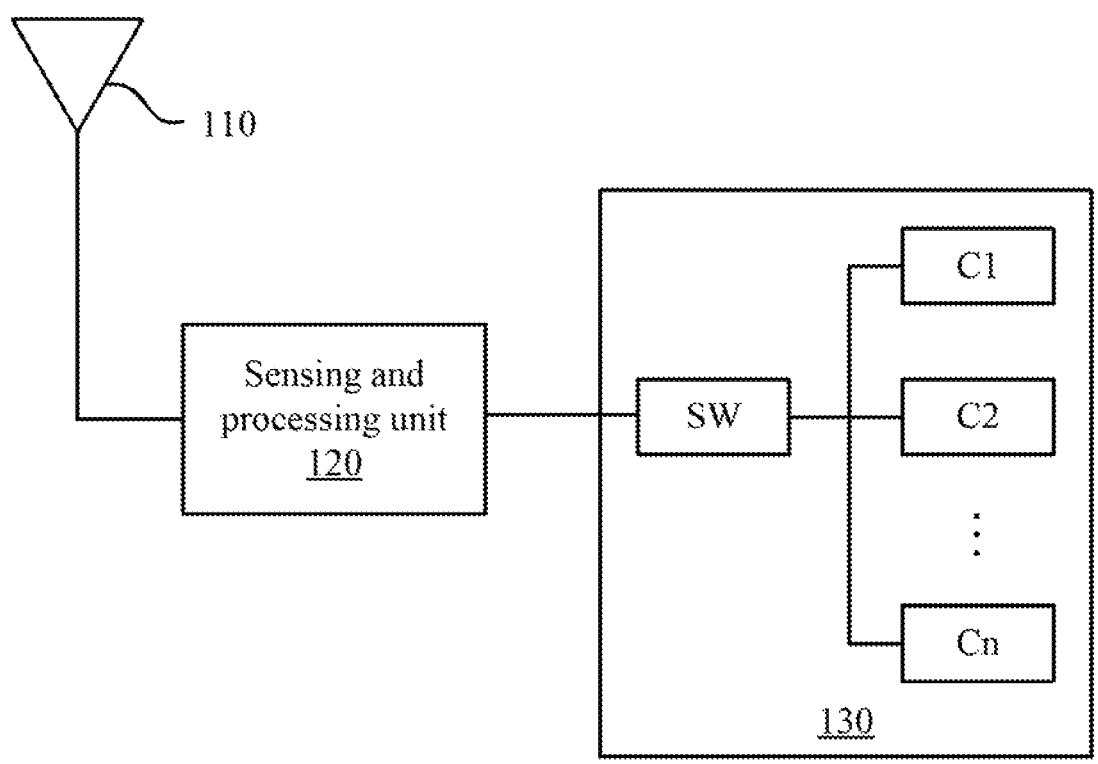
FIG. 2 is a schematic diagram of a communication device according to an embodiment of the present disclosure.
Figure 3:
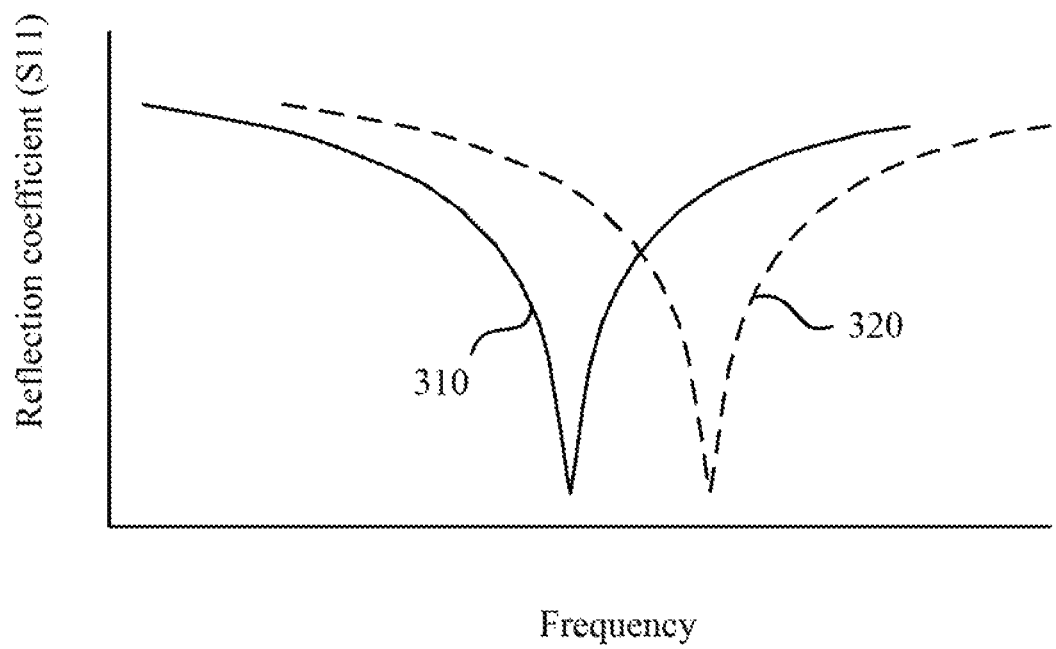
FIG. 3 is a schematic diagram showing a relationship between reflection coefficient and frequency of a communication device according to an embodiment of the present disclosure.

In an embodiment, as shown in FIG. 2, the adjustment unit 130 of the communication device 200 may be implemented as a switch SW and electronic components C1-Cn (e.g., capacitors), and the switch SW is coupled to the electronic components C1-Cn. Reference is made to FIG. 3. FIG. 3 is a schematic diagram showing a relationship between reflection coefficient (i.e., coefficient S11) and frequency of a communication device according to an embodiment of the present disclosure. For example, when the human body approaches the communication device 100, the frequency of the radio frequency signal of the communication device 100 is shifted (e.g., from a curve 320 to a curve 310, that is the frequency of the radio frequency signal is reduced) and the capacitance sensed by the sensing and processing unit 120 through the antenna unit 110 is also changed. The sensing and processing unit 120 controls the switch SW of the adjustment unit 130 to be coupled to one of the electronic components C1-Cn according to the capacitance sensed through the antenna unit 110, and then adjusts the frequency of the radio frequency signal by impedance adjustment through the coupled electronic component. In an embodiment, the coupled electronic component causes a frequency shift of the radio frequency signal. Specifically, the sensing and processing unit 120 controls the adjustment unit 130 to increase the frequency of the radio frequency signal according to the capacitance, and the adjusted radio frequency signal is shown as the curve 320.

Figure 4:
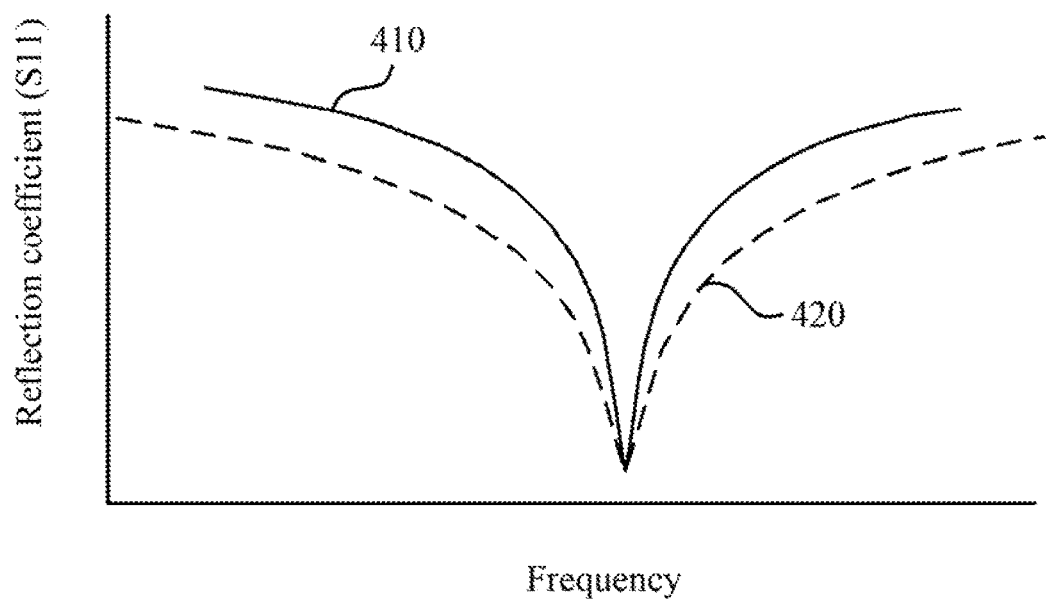
FIG. 4 is a schematic diagram showing a relationship between reflection coefficient and frequency of a communication device according to an embodiment of the present disclosure.

Reference is made to FIG. 4, FIG. 4 is a schematic diagram of a relation between reflection coefficient (i.e., coefficient S11) and frequency of a communication device according to an embodiment of the present disclosure. For example, when the system 140 operates in a low frequency band, the radio frequency signal often suffers from a problem of insufficient bandwidth, shown as curve. The system 140 transmits the system signal to inform the sensing and processing unit 120 that the system 140 currently operates in the low frequency band. The sensing and processing unit 120 controls the switch SW of the adjustment unit 130 to be coupled to one of the electronic components C1-Cn according to the system signal, and then adjusts the bandwidth of the radio frequency signal by aperture adjustment through the coupled electronic component. Specifically, the sensing and processing unit 120 controls the adjustment unit 130 to increase the bandwidth of the radio frequency signal according to the capacitance sensed through the antenna unit 110, and the adjusted radio frequency signal is shown as a curve 420. In an embodiment, when the system 140 operates in the high frequency band or a particular frequency band (e.g., LTE frequency bands B7, B17 but the present disclosure is not limited to the examples), the sensing and processing unit 120 may also control the adjustment unit 130 to increase the bandwidth of the radio frequency signal according to the capacitance sensed through the antenna unit 110.

Figure 5:
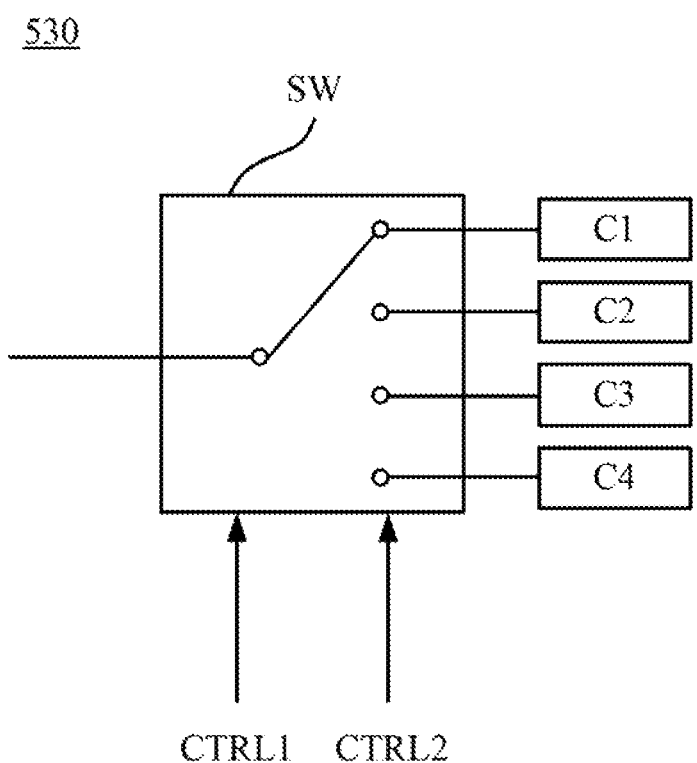
FIG. 5 is a schematic diagram of an adjustment unit of a communication device according to an embodiment of the present disclosure.

In an embodiment, as shown in FIG. 5, the adjustment unit 530 is implemented as a switch SW and electronic components C1-C4. The switch receives control signals CTRL1 and CTRL2 to determine one of the electronic components C1-C4 to be electrically coupled. For example, the control signal CTRL1 indicates whether the human body approaches the communication device. When the human body approaches the communication device, the control signal CTRL1 is at a logic high level (e.g., 1). In contrast, when the human body does not approach the communication device, the control signal CTRL1 is at a logic low level (e.g., 0). The control signal CTRL2 is the aforementioned system signal. When the control signal CTRL2 indicates that the system operates in the low frequency band, the control signal CTRL2 is at a logic high level (e.g., 1). In contrast, when the control signal CTRL2 indicates that the system operates in the high frequency band, the control signal CTRL2 is at a logic low level (e.g. 0). Therefore, the switch SW may generate signals corresponding to four different situations to determine one of the electronic components C1-C4 to be electrically coupled according to the control signals CTRL1 and CTRL2. The electronic components C1-C4 may have impedances designed according to the four different situations to optimize the radio frequency signal. As shown in Table 1, when the control signals CTRL1 and CTRL2 are both at the logic low level (e.g., 0), it indicates that the human body does not approach the communication device and the communication device operates in the high frequency band. The switch SW is then electrically coupled to the electronic component 1 corresponding to the situation. Therefore, the communication device may effectively adjust the radio frequency signal according to actual environment and operating frequency band. The present disclosure is not limited to the adjustment unit shown in FIG. 5. According to actual demands, the switch SW may also receive multiple control signals to be electrically coupled to one of multiple electronic components according to multiple situations (e.g., a specific frequency band). For example, the switch SW may receive three control signals to be electrically coupled to one of eight electronic components, and therefore the communication device may be applied to eight different situations.

TABLE 1

| Control signal CTRL1 | Control signal CTRL2 | Signal |
|---|---|---|
| 0 | 0 | Sig1 |
| 0 | 1 | Sig2 |
| 1 | 0 | Sig3 |
| 1 | 1 | Sig4 |

In another embodiment, the adjustment unit 130 may be implemented as a variable capacitor (not shown). The sensing and processing unit 120 is configured to adjust a capacitance of the variable capacitor to adjust impedance and aperture, and then to adjust the frequency and the bandwidth of the signal radio frequency. Adjusting methods are described as above, and are not described again herein.

In practice, the sensing and processing unit 120 may include a sensing circuit, a microprocessor and a capacitive sensor. The adjustment unit 130 may include a switch, a capacitor, a variable capacitor or another appropriate electronic component.

As a result, the communication device 100 and 200 of the present disclosure can use the capacitance sensed by the antenna unit 110 to control the adjustment unit 130 to adjust the frequency of the signal radio frequency signal, and use the system signal sent by the system 140 to control the adjustment unit 130 to adjust the bandwidth of the signal radio frequency signal. Therefore without complicated computation the present disclosure can rapidly and effectively improve the frequency shift of the radio frequency signal caused by the human body and the problem of insufficient bandwidth.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A communication device, comprising:
an antenna unit configured to transmit a radio frequency signal;
an adjustment unit configured to adjust a frequency and a bandwidth of the radio frequency signal; and
a sensing and processing unit disposed between the antenna unit and the adjustment unit to make the adjustment unit couple to the antenna unit through the sensing and processing unit, wherein the sensing and processing unit is configured to sense a capacitance through the antenna unit, to control the adjustment unit to adjust the frequency of the radio frequency signal according to the capacitance, and to control the adjustment unit to adjust the bandwidth of the radio frequency signal according to a system signal,
wherein the adjustment unit comprises at least one switch electrically coupled to at least one capacitor, and
wherein the sensing and processing unit is configured to control one of the at least one switch according to the capacitance to make the sensing and processing unit be electrically coupled to one of the at least one capacitor to adjust the frequency and the bandwidth of the radio frequency signal.

2. The communication device of claim 1, wherein the adjustment unit comprises a variable capacitor, and the sensing and processing unit is configured to adjust a capacitance of the variable capacitor to adjust the frequency and the bandwidth of the radio frequency signal.

3. The communication device of claim 1, wherein the sensing and processing unit controls the adjustment unit to adjust the radio frequency signal to generate a frequency shift according to the capacitance.

4. The communication device of claim 3, wherein the sensing and processing unit controls the adjustment unit to increase the frequency of the radio frequency signal according to the capacitance.

5. The communication device of claim 1, wherein the sensing and processing unit controls the adjustment unit to increase the bandwidth of the radio frequency signal according to the system signal.

6. The communication device of claim 1, wherein the sensing and processing unit controls the adjustment unit by using an open loop method.

7. The communication device of claim 1, wherein the sensing and processing unit comprises a capacitive sensor.

8. The communication device of claim 1, wherein the system signal indicates that a system connected to the communication device operates in a high frequency band, a low frequency band or a particular frequency band.

9. The communication device of claim 1, wherein the sensing and processing unit is configured to detect whether a human body approaches the communication device.

* * * * *